US008954638B2

(12) United States Patent
Davidson

(10) Patent No.: US 8,954,638 B2
(45) Date of Patent: Feb. 10, 2015

(54) SELECTIVE REPORTING OF TOUCH DATA

(71) Applicant: Perceptive Pixel, Inc., New York, NY (US)

(72) Inventor: Philip L. Davidson, New York, NY (US)

(73) Assignee: Perceptive Pixel, Inc., Redmond, WA (US)

( * ) Notice: Subject to any disclaimer, the term of this patent is extended or adjusted under 35 U.S.C. 154(b) by 202 days.

(21) Appl. No.: 13/654,108

(22) Filed: Oct. 17, 2012

(65) Prior Publication Data

US 2014/0104190 A1 Apr. 17, 2014

(51) Int. Cl.
| G06F 3/041 | (2006.01) |
| G06F 3/038 | (2013.01) |
| G06F 9/44 | (2006.01) |
| G06F 3/0488 | (2013.01) |
| G06F 3/0354 | (2013.01) |
| G06F 13/00 | (2006.01) |

(52) U.S. Cl.
CPC ............... *G06F 3/041* (2013.01); *G06F 3/038* (2013.01); *G06F 9/4443* (2013.01); *G06F 3/0416* (2013.01); *G06F 2203/04808* (2013.01); *G06F 3/04883* (2013.01); *G06F 3/03541* (2013.01)
USPC .............................. 710/73; 715/700; 715/762

(58) Field of Classification Search
CPC ............ G06F 3/00; G06F 3/041; G06F 13/00
USPC ....................... 710/73; 715/700, 762; 345/173
See application file for complete search history.

(56) References Cited

U.S. PATENT DOCUMENTS

| 5,119,079 | A * | 6/1992 | Hube et al. ................... 715/823 |
| 7,584,429 | B2 * | 9/2009 | Fabritius ....................... 715/739 |
| 8,196,055 | B2 * | 6/2012 | Zotov et al. ................... 715/764 |
| 8,219,913 | B2 * | 7/2012 | Terada .......................... 715/728 |
| 8,392,935 | B2 | 3/2013 | Grabowski |
| 2005/0022130 | A1 * | 1/2005 | Fabritius ....................... 715/739 |
| 2008/0291174 | A1 | 11/2008 | Mazeev et al. |
| 2009/0066664 | A1 | 3/2009 | Wong et al. |

(Continued)

OTHER PUBLICATIONS

Lü, Hao et al., "Gesture Coder: a Tool for Programming Multi-Touch Gestures by Demonstration", Proceedings of the SIGCHI Conference on Human Factors in Computing Systems, ACM, May 2012, 10 pages.

(Continued)

*Primary Examiner* — Christopher Shin
(74) *Attorney, Agent, or Firm* — Jeremy Snodgrass; Judy Yee; Micky Minhas

(57) ABSTRACT

A graphical user interface is rendered on a display screen of a touch screen device. The display screen includes a display area for rendering images, and the graphical user interface of the application is rendered in a portion of the display area. Digital touch data is generated in response to user interactions with a touch-sensitive surface of the touch screen device. A module of an operating system residing on the touch screen device is used to convert the digital touch data into OS touch events. The OS touch events and application location information are received at a system hook. The application location information identifies the portion of the display area of the touch screen device in which the graphical user interface of the application is rendered. The system hook filters the OS touch events based on the application location information and provides the filtered OS touch events to the application.

25 Claims, 3 Drawing Sheets

(56) References Cited

U.S. PATENT DOCUMENTS

| | | |
|---|---|---|
| 2010/0283747 A1 | 11/2010 | Kukulski |
| 2011/0080344 A1 | 4/2011 | Dura et al. |
| 2012/0084701 A1* | 4/2012 | Sirpal et al. .................... 715/773 |
| 2012/0169615 A1 | 7/2012 | Chang |
| 2012/0299852 A1* | 11/2012 | Hsu et al. ...................... 345/173 |
| 2013/0038548 A1* | 2/2013 | Kitada et al. ................... 345/173 |
| 2013/0263042 A1* | 10/2013 | Buening ........................ 715/783 |

OTHER PUBLICATIONS

U.S. Patent and Trademark Office, Non-Final Office Action Received for U.S. Appl. No. 13/673,547, Sep. 4, 2014, 6 pages.

* cited by examiner

SELECTIVE REPORTING OF TOUCH DATA

TECHNICAL FIELD

The following disclosure relates generally to touch screen devices.

BACKGROUND

A touch screen device may be configured to provide a two-dimensional graphical display area that includes one or more areas dedicated to a particular application. The touch screen device may include a touch-sensitive surface that enables the touch screen device to detect the presence and location of touches by a user on the surface of the two-dimensional graphical display area. The touch screen device may be a multi-touch device configured to concurrently detect and respond to multiple different touches.

DETAILED DESCRIPTION

Figure 1:
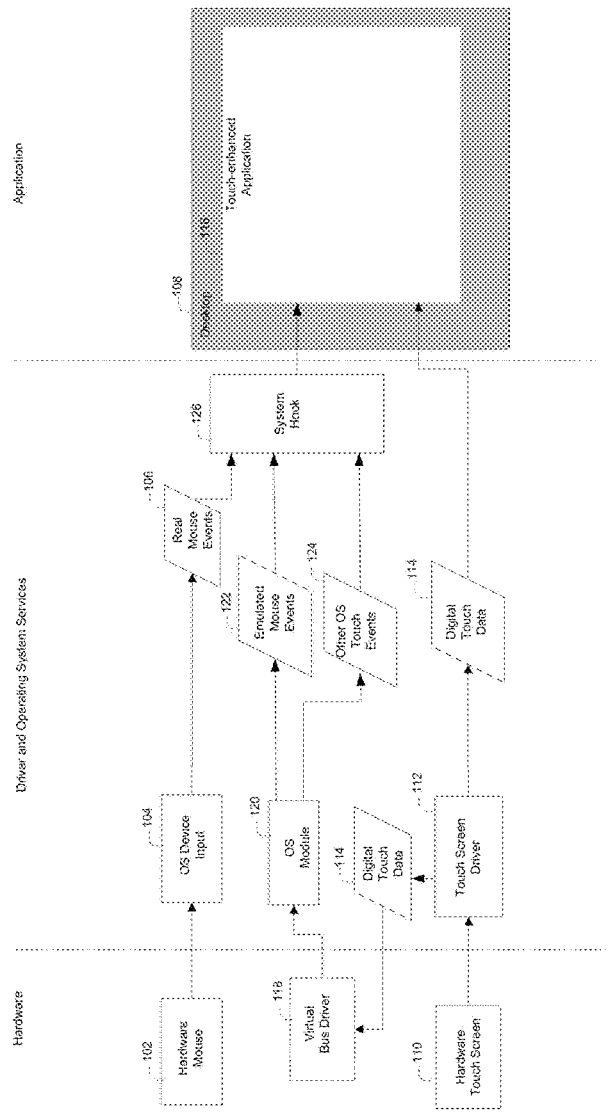
FIG. 1 is a diagram illustrating the flow of data and the data processing performed by an exemplary touch screen device that receives user input from a hardware mouse and also from a touch screen, processes the received user input to generate mouse events and OS touch events, and then selectively filters the mouse events and the OS touch events using a system hook.

Techniques for selective filtering of data on a touch screen device are described. The touch screen device includes a touch screen, i.e., display screen having a touch-sensitive surface positioned over the display screen. The touch screen is configured to generate touch data in response to user interactions with the touch-sensitive surface. The touch data may indicate user-generated screen touch events, such, as, for example, an event associated with one or more fingers or with one or more input mechanisms (e.g., one or more styluses) that provide input to the touch screen. For example, the event may include a tap, a double-tip, a flick, a slide, or a press-and-hold. The touch screen device may be a multi-touch device configured to receive and respond to multiple points of engagement (e.g., multiple points of direct physical contact) on the touch screen simultaneously.

In one implementation, a touch screen device is configured to enable a user to launch and interact with one application or with multiple applications concurrently. When a user interacts with the touch screen device to launch an application, the touch screen device may dedicate an area or region of its display screen to the launched application to enable the user to interact with that application. For example, the touch screen device may display a graphical desktop that covers substantially all of its display screen, and, in response to a user launching a particular application, may display a graphical window dedicated to that application on the graphical desktop. The user may interact with the application-specific graphical window to input data for processing by the corresponding application and to view data outputted by the corresponding application. The touch screen device may include a touch screen driver that is configured to receive user-generated screen touch events (e.g., a finger tap) from the touch screen of the touch screen device and convert the received screen touch events into digital touch data. The touch screen driver may then forward the digital touch data to a module of the operating system (OS) of the touch screen device. The OS module may generate OS touch events based on the digital touch data and may forward the OS touch events to a system hook. The system hook also may receive location information identifying the region of the display screen of the touch screen device occupied by the application (e.g., the area of the display screen in which the graphical window assigned to the application is rendered). Based on this location information, the system hook may filter out some or all of the OS touch events received from the OS module such that those OS touch events that are filtered out are not provided (i.e., reported) to the application for processing.

Using a system hook to selectively filter OS touch events generated from touch data by an OS module of a touch screen device may enable touch-enhanced applications to enjoy a greater flexibility in handling touch data than that provided by a typical OS, such as Windows 7, which fails to provide such a fine-grained control of digital touch data or OS touch events. A touch-enhanced application may be any one of: an application with code modifications to include the system hook (i.e., the selective filtering logic), an application without code modifications but with a plug-in or an extensible module to include the system hook, or an application without code modifications but with a secondary helper application or service that provides the system hook. For example, a system hook can be used to filter out all emulated mouse events generated by the OS module while still allowing other OS touch events generated by the OS module to be communicated to the application. Emulated mouse events are mouse events generated from touch data, rather than from interactions with a hardware mouse. Mouse events may include, for example, a double left mouse button click event, a single left mouse button click event, and a mouse move event. An emulated mouse event may be, for example, an emulated double left mouse button click event that is generated in response to a user double-tapping the touch-sensitive surface of the touch screen device with a finger. Other OS touch events that may be generated by the OS module based on received digital touch data include, for example, a one finger tap event, a two finger slide event, and a one finger slide event.

In some implementations, the system hook only filters out a predetermined subset of the OS touch events. For example, the system hook may filter out all emulated mouse events or, alternatively, may filter out only a predetermined subset of all emulated mouse events. In some implementations, the system hook may additionally or alternatively filter out all or a predetermined subset of the other OS touch events. In some implementations, the system hook may filter out all OS touch events (i.e., all emulated mouse events and all other OS touch events) produced by the OS module, while allowing only "real" mouse events (i.e., mouse events corresponding to user interaction with a hardware mouse rather than with a touch sensitive surface) to be reported to the application.

Since the system hook uses location information to distinguish between different applications concurrently displayed on the touch screen of the touch screen device, the system hook may be able to provide application-specific filtering where each particular application has its own filtering parameters and is able to selectively filter out its own specific set of OS touch events and/or digital data. In this manner, each application may be uniquely (or non-uniquely) associated with its own filter criteria and may be able to pass or suppress the reporting of any or all OS touch events (including emulated mouse events) produced by the OS module. This fine-grained application-specific control of the reporting of OS touch events enables applications to have much greater flexibility in how little or how much the application will leverage the touch data processing provided by the OS.

In some implementations, applications may be placed into two different categories, with a first of the two categories corresponding to ordinary applications that allow normal passage of all OS touch events (including emulated mouse events provided by the OS) without filtering and the second of the two categories corresponding to enhanced applications that filter out a predetermined amount of OS touch events (e.g., filter out all emulated mouse events provided by the OS) such that those OS touch events are not reported to the enhanced applications. Any given application that is launched may be designated as corresponding to one of the two categories and filtering (i.e., selective reporting) of OS touch events for that application may then proceed in accordance with the filtering criteria assigned to that particular designated category. In other implementations, more than two categories may be used for distinguishing applications for the purpose of selective reporting of OS touch events, with each of the categories having its own distinct filtering criteria.

The system hook may determine which application's filtering criteria to apply to a given emulated mouse event or OS touch event by identifying the starting position and/or the ending position of the user-generated touch corresponding to the emulated mouse event or OS touch event. For example, if the starting position is inside the region of the touch screen occupied by a particular application (i.e., the region of the touch screen where the particular application's graphical user interface is rendered), the system hook may choose to apply that applications' filtering criteria to the digital event, regardless of the ending position of the user-generated touch. Additionally or alternatively, if the starting position is outside the region of the touch screen occupied by the particular application and the ending position is inside the region, then the system hook may choose not to apply that application's filtering criteria to the digital event.

In some implementations, the touch screen driver may convert user-generated touch events from multiple users simultaneously touching the touch screen device. The touch screen driver may forward the digital touch data to the OS module through a virtual bus device. The virtual bus device enables the OS module to treat the digital touch data as if the data came from a virtual device, such as a virtual USB device. The touch screen driver also may forward a copy of the digital touch data to the application launched on the touch screen device.

In some implementations, the application location information may include, for example, coordinate information associated with a window of the application, coordinate information associated with a window pane of the application, size information associated with a window of the application, and/or size information associated with a window pane of the application. The coordinate information may be, for example, at a pixel level corresponding to a display resolution of the display screen of the touch screen device. The location information may be dynamically generated in response to the application be launched on the touch screen device and/or may be dynamically updated as the region occupied by the application on the display screen of the touch screen device changes during operation of the application. In some implementations, each portion of a region associated with a given application (e.g., each pane of a window of the application) is assigned its own different system hook filtering criteria for filtering out OS touch events.

In some implementations, the operating system may be a version of the WINDOWS operating system, a version of the Mac operating system, a version of the Linux operating system, or other variants of the same.

FIG. 1 is a diagram illustrating the flow of data and the data processing performed by a touch screen device that receives user input from a hardware mouse and also from a touch screen, processes the received user input to generate mouse events and OS touch events, and then selectively filters the mouse events and the OS touch events using a system hook.

A hardware mouse 102 is configured to generate user input data in response to user interactions with the hardware mouse 102. The hardware mouse 102 may be a conventional computer mouse that enables a user to move a graphical pointer rendered on a display screen of the touch screen device by moving the mouse and also enables the user to press one or more buttons on the mouse to trigger different interactions with an application. The user input data generated by the mouse 102 may indicate user depression of one or more buttons on the mouse 102 and may be processed to determine the direction and speed of user motion of the mouse 102 on a surface. In some implementations, the hardware mouse 102 may have three buttons and the user input data generated by the mouse may include data that identifies one or more of the three buttons with which the user interacted and also the manner of user interaction with the button (e.g., clicked the button, double-clicked the button, pressed and held down the button, and/or depressed a button that was previously held down). In some implementations, the hardware mouse 102 may have more or less buttons than three and may additionally have a scroll wheel. In some implementations, a trackball controller, a touch pad, a joystick or other input mechanism that provides control of a graphical pointer in a manner akin to that provided by a mouse may be used in addition to or as an alternative to the hardware mouse 102, and may provide the same or similar user-generated input.

An OS device input 104 is configured to convert the received user-generated mouse input into real mouse events 106 (e.g., a double-click left mouse button event, a single-click right mouse button event, and/or motion of the mouse in a particular direction). The OS device input 104 may be a device driver or an I/O module of the OS of the touch screen device. The OS device input 104 may communicate with a teletypewriter (TTY) port of the touch screen device linked to the hardware mouse 102. The OS device input 104 also may communicate with a universal serial bus (USB) port linked to the hardware mouse 102. The linking may be a wired link or a wireless link. In some implementations, the hardware mouse 102 is integral with the touch screen device such that the real mouse events 106 are received directly from the hardware mouse 102, rather than via a port.

The real mouse events 106 are event data that may be processed to move a graphical pointer hovering over an application displayed on a graphical desktop 108 that is displayed on a display screen of the touch screen device. The real mouse events 106 also may trigger interactions with an application (e.g., item selection interactions or menu invocation interactions).

A hardware touch screen 110 receives user-generated touch input on its touch-sensing surface and produces corresponding touch data that is communicated to the touch screen device. The user may provide the touch input by engaging the touch screen 110 using one or more input mechanisms, such as, for example, one or more fingers or styluses. The user may engage the touch screen 110 by, for example, directly physically contacting the touch screen 110 with the one or more input mechanisms or, additionally or alternatively, hovering the one or more input mechanisms in close physical proximity to the surface of the touch screen 110 such that the touch screen 110 is able to sense the touch, despite the lack of direct physical contact.

The touch input may indicate both a screen location where each of one or more input mechanisms initiated engagement (e.g., direct physical contact) with the touch screen 110 and a corresponding motion over time for each of the one or more input mechanisms while remaining engaged with the touch screen 110. The touch input may indicate, for example, a tapping motion at the point where engagement was initiated on the touch-sensing surface, a sliding motion on the touch-sensing surface, a pinch or a zoom motion of two points of engagement on the touch-sensing surface, and a motion involving more than two points of engagement on the touch-sensing surface. In some implementations, the touch screen 110 may generate touch input from more than one user simultaneously engaging the touch-sensing surface of the touch-screen 110. In some implementations, the touch input may include user identification data that identifies which user provided each user-specific touch input.

The hardware touch screen 110 may utilize any of a variety of touch-sensing technologies including, for example, a resistive touch-sensing technology, a surface acoustic wave touch-sensing technology, a capacitive touch-sensing technology, and an infrared touch-sensing technology. In some implementations, the touch screen 110 may include a capacitive touch sensor having circuitry to determine the locations of user inputs on a detection grid by detecting changes in conductor capacitances caused by the one or more input mechanisms used by the user to engage the detection grid. The detection grid may, for example, be a sensor matrix made up of a first group of conductors that are positioned substantially parallel to each other and a second group of conductors that are positioned substantially parallel to each other, where each of the conductors in the first array is positioned to intersect with every conductor in the second array and, vice versa, to thereby form a matrix. Each of the intersections between a conductor in the first array and a conductor in the second array may be a detection point of the grid where capacitances are measured.

The one or more user input mechanisms may, for example, be fingers or styluses and may engage the detection grid by directly physically contacting one or more of the conductors in the sensor matrix or by otherwise hovering in close physical proximity to the one or more conductors (e.g., within 10 mm from the surface of the one or more conductors) such that a detectable change in capacitance at the detection points of the grid occurs. For example, a user may engage the grid by positioning a finger in close physical proximity to the grid, thereby causing the capacitance at the detection points of the grid that are located near the user's finger to deviate from a baseline value by, for example, 10 femtofarads for the detection points located at the center of the user's finger and 1 femtofarad for the detection points located at the edge of the user's finger.

A touch screen driver 112 may communicate with any port of the touch screen device that receives data from the hardware touch screen 110. The port may be a serial port, a USB port, a High-Definition Multimedia Interface (HDMI) port, etc. In some implementations, the touch screen device is a single integrated device and the touch screen driver 112 receives data directly from the hardware touch screen 110, rather than via an external port.

The touch screen driver 112 is configured to convert user-generated touch input into digital touch data 114. The digital touch data 114 may include information encoding the type of user-generated touch input, for example, a one-finger input, a two-finger input, etc., and the location on the touch-sensing surface of the touch screen 110 corresponding to the user-generated touch input. The encoded location information may identify or be processed to identify the location where engagement was initiated by the user, such as, for example, the location where the user initially placed an input mechanism (e.g., a finger) onto the touch-sensing surface, a path on the touch screen traced by the user input mechanism as it remained engaged with the touch-sensing surface, and where engagement was terminated, such as, for example, where the user raised the input mechanism (e.g., the finger) from the touch-sensing surface. The precision of the information encoding the location on the touch-sensing surface may depend on the underlying sensing technology of the touch-sensing surface and/or the density of sensor distribution on the touch-sensing surface. The location information may be expressed, for example, using screen-space coordinates (e.g., pixel coordinates of a display or detection point coordinates of a detection grid).

The digital touch data 114 also may include location information identifying the screen area occupied by a touch-enhanced application 116. The touch-enhanced application 116 is an application that receives and responds to touch data received from a user. The touch-enhanced application 116 is associated with particular filtering criteria used by a system hook to selectively suppress reporting of a predetermined set of OS touch events generated by an OS module based on the received touch data. FIG. 1 depicts an example of a touch-enhanced application 116 that has a graphical user interface corresponding to a rectangular region rendered within the rendered graphical desktop 108. The rectangular region may, for example, be the area of a displayed window.

The touch-enhanced application 116 may be an application program on any operating system, such as, for example, Windows, Macintosh, Linux, Unix, etc. The application program may be compiled for any processor architectures such as, for example, a 32-bit architecture, a 64-bit architecture, etc. The application program also may run on a Java Virtual Machine (JVM). The application may be written in any programming language, such as, for example, C++, Java, Python, Tcl/Tk, etc.

The touch screen driver 112 may obtain the location information for the touch-enhanced application 116 from the application itself and/or from the OS. The location information may include, for example, the screen coordinates (e.g., pixel coordinates) of the four corners of a window of the touch-enhanced application 116 displayed on the desktop 108 or, additionally or alternatively, a designated corner coordinate and a size of the window (e.g., a bottom left corner of the window is positioned at coordinate 212, 500, with the window having a 400 pixels by 400 pixels size). The location information also may include, for example, the screen coordinates of the four corners of all pop-up windows of the touch-enhanced application 116 or, additionally or alternatively, a designated corner coordinate and a size for each pop-up window.

The touch screen driver 112 is configured to send the digital touch data 114 to a virtual bus driver 118 and to the touch-enhanced application 116. The virtual bus driver 118 is configured to forward the digital touch data 114 to an OS module 120 in a manner that results in the OS module 120 treating the digital touch data 114 as if it were coming from a low-level hardware device, such as a universal serial bus (USB) device. The virtual bus driver 118 may, for example, be a virtual USB driver. The virtual bus driver 118 also may be a driver that uses a different data communications standard, such as, for example, a small computer system interface (SCSI) standard.

The OS module 120 is configured to receive digital touch data 114 from the virtual bus driver 118 and generate OS touch events based on the digital touch data 114. The OS touch events may include emulated mouse events 122 and other OS touch events 124.

In generating emulated mouse events 122, the OS module 120 may convert one particular type of digital touch data 114 into a given type of mouse event. For example, the OS module 120 may convert digital touch data indicating a one-finger tap motion by a user on the touch screen 110 into an emulated mouse event of a left-button single click. The OS module 120 may convert digital touch data indicating a one-finger lift motion by a user on the touch-sensing surface into an emulated mouse event of a left-button lift. The OS module 120 may additionally convert a two-finger press-and-hold motion by a user on the touch screen 110 into an emulated middle-button press event or a middle-scroll press event. The OS module 120 further may convert a one-finger press-and-slide motion by a user on the touch screen 110 into an emulated mouse sliding event. The OS module 120 also may convert some digital touch data 114 into a default emulated mouse event, such as, for example, an emulated mouse motion event. For example, the default emulated mouse event may be a right-button press event. The OS module 120 may choose to ignore some digital touch data 114 received. For example, the OS module 120 may disregard digital touch data 114 if the digital data 114 does not correspond to: a one-finger tap motion by a user on the touch-sensing surface, a one-finger lift motion by a user on the touch-sensing surface, a one-finger press-and-slide motion by a user on the touch-sensing surface, or a two-finger press-and-hold motion by a user on the touch-sensing surface.

In some implementations, the touch-enhanced application 116 is unable to distinguish between real mouse events 106 and emulated mouse events 122. That is, in these implementations, while the system hook 126 is able to distinguish emulated mouse events 122 from real mouse events 106 based on their different sources (and is thereby able to selectively filter them differently), the touch-enhanced application 116 is unable to make such distinction. Stated differently, the emulated mouse events 122 and the real mouse events 106 appear identical to the touch-enhanced application 116. For example, an emulated right-button press mouse event generated from user-interactions with the touch screen 110 and a real right-button press mouse event generated from user-interactions with the hardware mouse 102 appear as the same identical right-button press mouse event to the touch-enhanced application 116, which has no ability to discern the source of the right-button press mouse event.

The OS module 120 may generate other OS touch events 124 that are distinct from the emulated mouse events 122. These other OS touch events may include, for example, a one finger tap event, a two-finger pinch event, or a one finger slide event.

In generating the emulated mouse events 122 and the other OS touch events 124, the OS module 120 may additionally provide as part of or in connection with the generated OS touch event the corresponding location information regarding the location on the hardware touch screen 110 corresponding to the user-generated touch input (e.g., an estimate of the current location on the touch screen 110 that is being engaged by the user input mechanism). The location information may include, for example, the two-dimensional screen coordinates of the current point of contact of the input mechanism on the touch screen 110 (e.g., 500, 250, where the first number specifies a pixel row and the second number specifies a pixel column in the pixel matrix of the display screen of the touch screen device).

A system hook 126 is configured to receive real mouse events 106 from the OS device input 104, emulated mouse events 122 from the OS module 120, and other OS touch events 124 from the OS module 120. The system hook 126 also has access to location information regarding the area on the hardware touch screen 110 occupied by the touch-enhanced application 116. The system hook 126 may be realized as a subroutine installed by an application at a point in the message handling processing of the operating system running on the touch screen device. The subroutine may monitor or intercept message/event traffic in the operating system and process certain types of messages/events before they reach their target application (e.g., before they reach their target window procedure in a windows-based operating system). In some implementations, the system hook 126 may be implemented as a mechanism to intercept function calls. In one implementation, the interception may be realized by altering an import table of an application so that the application can dynamically load a handling subroutine to process digital events. In another implementation, a wrapper library may be altered to redirect a function call to dynamically load the handling subroutine to process digital events. The operating system of the touch screen device may, for example, be a version of the WINDOWS operating system, a version of the Mac operating system, a version of the Linux operating system, or other current or future operating systems.

The system hook 126 is configured to selectively filter out certain of the events it receives based on application location information. The events received by the system hook 126 may be associated with a particular application based on the location information included in or associated with the events and the application location information. When an event is assigned to a particular application (i.e., determined to be directed to that application based on location information), the system hook 126 may apply filtering criteria assigned to that application to determine whether to pass the event to the application for processing or, alternatively, suppress the event such that it is not reported to the application. In some implementations, the system hook 126 always passes real mouse events 106, irrespective of application location information.

In some implementations, each touch-enhanced application 116 has its own separate system hook 126 specific to that application that focuses on filtering out events deemed to be directed to that application based on the application location information and the event location information. In these implementations, each touch-enhanced application 116 may, for example, install its own system hook 126 automatically when it is launched to thereby enable the touch screen device to use that system hook 126 to filter operating system events in accordance with that application's specific filtering criteria. For example, if the filtering criteria for the touch-enhanced application 116 indicate that all OS touch events should be suppressed (i.e., not reported), the system hook 126 may install a system hook 126 that filters out (i.e., does not report) emulated mouse events 122 and other OS touch events 124 that are directed to the touch-enhanced application 116. The system hook 126 may determine that an emulated mouse event 122 or other OS touch event 124 is directed to the touch-enhanced application 116 if, for example, the event is determined, based on its location information, to originate from within a screen area occupied by the touch-enhanced application 116.

The touch-enhanced application 116 is configured to receive digital touch data 114 from the touch screen driver 112 and filtered events from the system hook 126. The touch-enhanced application 116 may respond to user interactions with the touch screen 110 by processing the digital touch data 114 received from the touch screen driver 112. The touch-enhanced application 116 also may respond to user interactions with the hardware mouse 102 and/or with the touch screen 110 by processing the filtered events.

Specifically, depending on the application's filtering criteria, the events that were not filtered out by the system hook 126 may include none, all or a subset of the real mouse events 106, the emulated mouse events 122 and the other OS touch events 124. For example, when the system hook 126 of the application does not filter out real mouse events 106, the touch-enhanced application 116 may respond to user interactions with the hardware mouse 102 by receiving and responding to the corresponding real mouse events 106 generated by the OS device input 104. Moreover, when the system hook 126 of the application is also configured to filter out the emulated mouse events 122, the application may not respond to these events and, therefore, may not provide emulated mouse functionality (unless the application itself provides this functionality separately in its processing of the digital touch data 114).

In another example, when the system hook 126 is configured to not filter out other OS touch events 124, an OS touch event generated by the OS module 120 in response to a one-finger tap motion by a user on the touch screen 110 may be reported to the application 116 for processing. The application 116 may, in response to the event, cause a pointer to appear at the point of contact (or, more generally, the point of engagement) of the one-finger tap motion. In another example, an OS touch event generated by the OS module 120 in response to a two-finger pinch by a user on the touch screen 110 may be reported to the application 116 for processing. The application 116 may, in response to the event, cause a pop-up window to appear at the point of contact (or, more generally, point of engagement) on the hardware touch screen 110. The touch-enhanced application 116 may obtain the location information associated with filtered events from the OS module 120 by using one or more Application Program Interfaces (APIs) to query, for example, the OS module 120.

Figure 2:
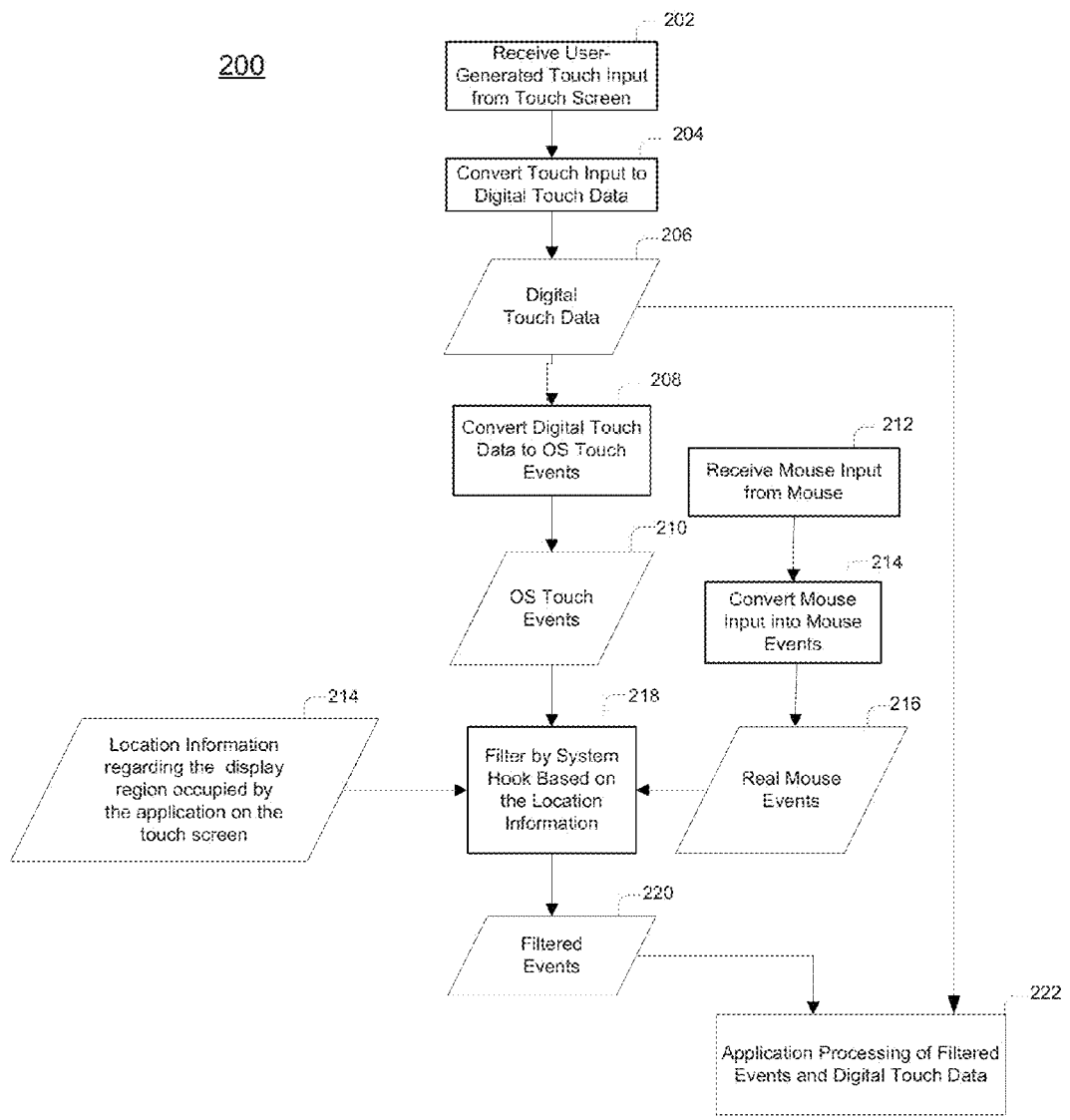
FIG. 2 is a flow chart of an exemplary process for application-specific filtering of OS touch events on a touch screen device using a system hook.

FIG. 2 is a flow chart of a process 200 for application-specific filtering of OS touch events on a touch screen device using a system hook. For convenience, the process 200 shown in FIG. 2 references particular componentry described with respect to FIG. 1. However, similar methodologies may be applied in other implementations where different componentry is used to implement the process 200, or where the functionality of process 200 is distributed differently among the components shown in FIG. 1.

User touch input generated in response to user interactions with a touch-sensing surface of the touch screen device is received (202). The touch-sensing surface may, for example, be the touch-sensing surface of the hardware touch screen 110.

The user-generated touch input is converted into digital touch data 206 by a touch screen driver of the touch screen device (204). The touch screen driver may, for example, be the touch screen driver 112. The digital touch data 206 may be provided to or otherwise accessed by an OS module and a touch-enhanced application for further processing.

The digital touch data 206 is converted into OS touch events 210 by an OS module (208). The OS module may be, for example, OS module 120. The digital touch data 206 may be processed to generate, for example, emulated mouse events and other OS touch events. For example, the OS module 120 may cast some digital touch data 206 as an emulated left-mouse-down event, an emulated left-mouse-up event, an emulated right-mouse-down event, an emulated right-mouse-up event, an emulated mouse-scroll event, etc. The OS module 120 also may process digital touch data 206 to generate other OS touch events including, for example, gesture events such as tap, press and tap, two finger tap, pinch, expand (i.e., a spreading of fingers apart), etc.

OS touch events may be implemented as OS-specific messages. In some implementations, the OS-specific messages may include location information, for example, coordinate information, for the digital touch data 206. The coordinate information may be matched to a current screen resolution on the hardware touch screen 110. As described in more detail below, the coordinate information may be used by the system hook to filter OS touch events.

User mouse input generated in response to user interactions with a hardware mouse of the touch screen device is received (212). The hardware mouse may be, for example, the hardware mouse 102 and may be separate from but communicatively coupled to the touch screen device via an external port. Alternatively, the hardware mouse and the touch screen device may be a single integral device.

The user-generated mouse input is converted into real mouse events 106 by an OS device input (216). The OS device input may be, for example, the OS device input 104.

The system hook filters the OS touch events and, optionally, the real mouse events based on application location information (218). The system hook may be, for example, the system hook 126.

The system hook 126 may receive from the OS or from the touch-enhanced application 116 location information 214 specifying the region on the display screen of the touch screen device occupied by the application 116. The region occupied by the application 116 may be, for example, a region of the display screen in which is rendered a window launched by the application 116 with which the user may interact to provide data to and/or receive data from the application 116. The location information 214 may include coordinate information that specifies the location and the size of the display region occupied by the application 116. As stated previously, the coordinate information may be in a two-dimensional format and may, for example, identify the coordinate of one or more corners of the region and may additionally specify the size of the region.

In some implementations, the application 116 may occupy multiple regions of the display screen such as, for example, multiple regions corresponding to multiple different simultaneously displayed windows launched by the application (or otherwise associated with the application) with which the user may interact to provide data to and/or receive data from the application 116. The system hook 126 may use the same filtering criteria for all regions of the application 116. Alternatively, the system hook 126 may use different filtering criteria for each of the multiple different regions of the application 116.

In some implementations, the location information 214 may additionally or alternatively include sub-region location information that identifies a specific portion of a region or regions occupied by an application. For example, the location information 214 may include coordinate information that defines the location and size of certain areas within a main application window, such as, for example, a ribbon window, a window pane or panel, a preview window, etc. The system hook 126 may use the filtering criteria for a given region for all of its sub-regions. Alternatively, the system hook 126 may use different filtering criteria for each sub-region. For example, the system hook 126 may filter out all OS emulated mouse events generated as a result of touch interactions within a window pane of a main application window that displays an interactive three-dimensional globe, while allowing all OS emulated mouse events generated as a result of touch interactions within a ribbon window within the main application window to pass to the application 116 for processing.

The system hook determines whether or not to filter a given OS touch event 210 based on the location information associated with the OS touch event 210, the location information associated with the application, and the application's filtering criteria. For example, if the location information associated with an OS touch event 210 and the application location information indicate a point of contact of the corresponding user-generated touch input within the region occupied by the application 116, then the system hook may apply that application's filter criteria to the OS touch event 116 to, for example, suppress the OS touch event 210, i.e., not report the event to the application 116 for processing. If the location information associated with an OS touch event 210 indicates more than one point of contact, then the system hook may apply the application's filter criteria to the OS touch event 210 only if all of the multiple points of contact are within the region occupied by the application or, alternatively, if at least one of the multiple points of contact is within the region occupied by the application. Notably, this same technique for determining which filter criteria should be applied to a given OS touch event 210 based on location can be applied to filter criteria that is specific to different regions or sub-regions occupied by a particular application.

As noted above, the system hook may optionally apply application-specific filter criteria that filters out real mouse events 106 as well as OS touch events 210. In some implementations, the system hook, however, does not enable applications to filter out real mouse events 106.

Filtered events 220 is the filtering result produced by the system hook. Since a touch screen device may display more than one application 116 concurrently, the filtered events 220 may include a different set of filtered events for each concurrently displayed application 116. The filtered events 220 also may include sets of events for particular regions and/or sub-regions of applications. As noted previously, in some implementations, each application 116 may have its own system hook that produces its own set of filtered events 220.

The application receives and processes the filtered events 220 and the digital touch data (222). In some implementations, the application may receive a different set of filtered events for each of multiple different regions (e.g., each of the application's different windows) occupied by the application and/or for each of multiple different sub-regions (e.g., window panes) occupied by the application. Each set of filtered events may trigger a separate and distinct process specific to that region (e.g., window) or sub-region (e.g., window pane).

Figure 3:
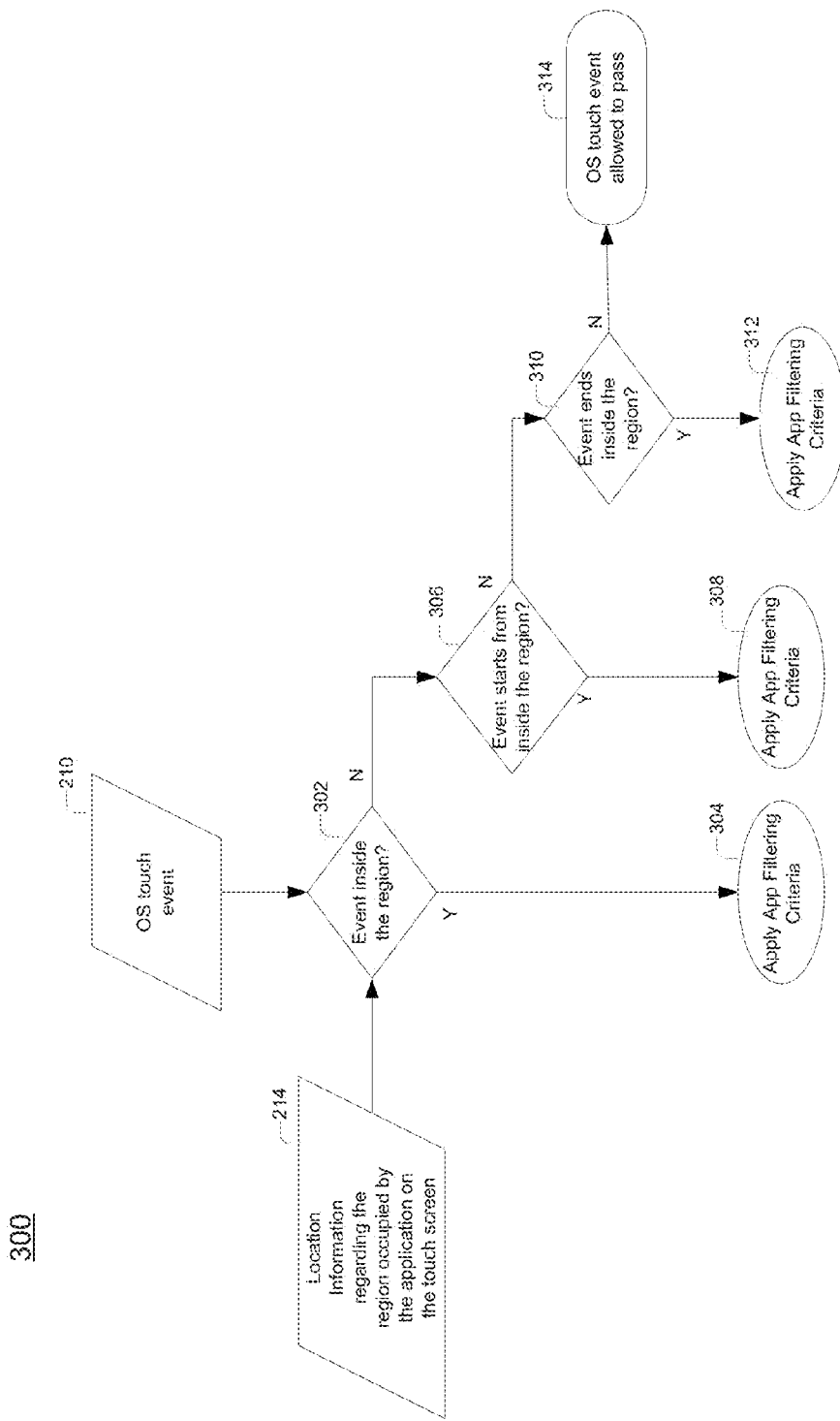
FIG. 3 is a flow chart of an exemplary process implemented by a system hook to assign an OS touch event to an application based on application location information.

FIG. 3 is a flow chart of a process 300 implemented by a system hook to assign an OS event to an application based on application location information. For convenience, the process 300 shown in FIG. 3 references particular componentry described with respect to FIG. 1. However, similar methodologies may be applied in other implementations where different componentry is used to implement the process 300, or where the functionality of process 300 is distributed differently among the components shown in FIG. 1.

The system hook 126 receives OS touch events 210 from the OS module 120 and receives application location information 214 for the touch-enhanced application 116 from the OS of the touch screen device or from the application itself. The system hook 126 may determine whether the user-generated input that triggered an OS touch event 210 was inside a region occupied by the application (302). For example, if the OS touch event 210 is a single tap event, the system hook 126 may determine whether the screen coordinates indicating the location where the single tap event occurred on the touch screen 110 are within the range of coordinates corresponding to the region occupied by the touch-enhanced application 116. If the region, for example, is an area of an application window that is 400 pixels by 600 pixels in size having its left bottom corner positioned at the coordinates 40, 40, the system hook 126 may determine whether the single tap event occurred within the region of the application by determining whether the location of the single tap event has an x coordinate between 40 to 441 pixels and a y coordinate between 40 to 641 pixels.

In another example, if the OS touch event 210 is a one finger press-and-slide gesture, the system hook 126 may determine whether both the starting position and the ending position of the user-generated touch input are within the range of coordinates corresponding to the region occupied by the touch-enhanced application 116. In this example, if both the starting position and the ending position (and, in some implementations, all positions between the starting and ending positions) are within the range of coordinates corresponding to the application region, then the system hook 126 may conclude that the OS one finger press-and-slide gesture event is inside the application region.

If the system hook 126 concludes that the OS touch event 210 is inside the application region, the system hook 126 may apply the filtering criteria assigned to that application to the OS touch event 210 (304). As noted previously, if the filtering criteria indicate that the particular OS touch event 210 should be filtered out, the OS touch event 210 is not reported to the touch-enhanced application 116. Conversely, if the filtering criteria indicate that the particular OS touch event 210 should not be filtered out, the OS touch event 210 passes through the system hook 126 and is reported to the touch-enhanced application 116, which may initiate processing in response to and based on the OS touch event 210.

If the system hook 126 concludes that the user-generated input that triggered the OS touch event 210 was not inside a region occupied by the application, the system hook 126 may determine whether the event started from inside the application region (306). The system hook 126 may determine whether the event started from inside the application region by comparing coordinates of the starting position of the event (i.e., the coordinates where the user initiated contact with the touch screen to generate the event) with the range of coordinates corresponding to the application region. For example, if the OS touch event 210 is a one finger press-and-slide gesture event, the system hook 126 may compare the coordinates corresponding to the screen location where the user's one finger initiated contact with the touch screen 110 with the range of coordinates corresponding to the application region.

If the screen coordinates where the event started fall within the range of coordinates corresponding to the application region, the system hook 126 may conclude that the event started from inside the region and, therefore, may apply the corresponding application's filtering criteria to the OS touch event 210 (308). If the filtering criteria indicate that the particular OS touch event 210 should be filtered out, the OS touch event 210 is not reported to the touch-enhanced application 116. Conversely, if the filtering criteria indicate that the particular OS touch event 210 should not be filtered out, the OS touch event 210 passes through the system hook 126 and is reported to the touch-enhanced application 116, which may initiate processing in response to and based on the OS touch event 210.

If the system hook 126 concludes that the user-generated input that triggered the OS touch event 210 was not inside a region occupied by the application and did not start inside a region occupied by the application, the system hook 126 may determine whether the event ended within the application region (310). The system hook 126 may determine whether the event ended inside the application region by comparing the coordinates of the ending position of the event (i.e., the coordinates of the user contact with the touch screen at the end of the interaction that triggered the event) with the range of coordinates corresponding to the application region. For example, if the OS touch event 210 is a one finger press-and-slide gesture event, the system hook 126 may compare the coordinates corresponding to the screen location where the user's one finger finished its slide movement on the touch screen 110 with the range of coordinates corresponding to the application region.

If the screen coordinates where the event ended fall within the range of coordinates corresponding to the application region, the system hook 126 may conclude that the event ended inside the region and, therefore, may apply the corresponding application's filtering criteria to the OS touch event 210 (312). If the filtering criteria indicate that the particular OS touch event 210 should be filtered out, the OS touch event 210 is not reported to the touch-enhanced application 116. Conversely, if the filtering criteria indicate that the particular OS touch event 210 should not be filtered out, the OS touch event 210 passes through the system hook 126 and is reported to the touch-enhanced application 116, which may initiate processing in response to and based on the OS touch event 210.

If the system hook 126 concludes that the user-generated input that triggered the OS touch event 210 was not inside a region occupied by the application, did not start inside a region occupied by the application, and did not end inside a region occupied by the application, the system hook 126 does not apply the application's filtering criteria to the OS touch event 210 and the OS touch event 210 is allowed to pass (314). In some implementations, allowing the OS touch event 210 to pass results in the OS touch event 210 being reported to the touch-enhanced application 116. In other implementations, allowing the OS touch event 210 to pass results in the OS touch event 210 not being reported to the touch-enhanced application.

In some implementations, each touch-enhanced application 116 has its own system hook 126 with its own filtering criteria and each system hook 126 independently monitors the OS touch events 210 to determine which OS touch events 210 should be reported or not reported to its corresponding touch-enhanced application 116.

In some implementations, the system hook 126 may perform operations 302 through 314 for an OS touch event 210 for a sub-region (e.g., a window pane) of the touch-enabled application 116, instead of or in addition to a region (e.g., a window). In some implementations, the system hook 126 may perform operations 302 through 312 for an OS touch event 210 once for each of multiple different regions (e.g., multiple different windows) and/or for each of multiple different sub-regions (e.g., multiple different window panes) of the touch-enabled application 116 before allowing the OS touch event 210 to pass through the system hook.

In some implementations, only a subset of operations 302 through 312 are performed for the application region, sub-region, regions, and/or sub-regions. For example, if operations 302 and 304 are performed but operations 306 through 312 are not performed, an OS touch event 210 may be designated for potential filtering by the touch-enhanced application 116 only if the OS touch event 210 is determined to be inside that application's display region, sub-region, regions, and/or sub-regions. In another example, if operations 302, 304, 310 and 312 are performed but operations 306 and 308 are not performed, an OS touch event 210 may be designated for potential filtering by the touch-enhanced application 116 only if the OS touch event 210 is determined to either be inside or to start outside but end inside that application's display region, sub-region, regions, and/or sub-regions. In yet another example, if operations 302, 304, 306 and 308 are performed but operations 310 and 312 are not performed, an OS touch event 210 may be designated for potential filtering by the touch-enhanced application 116 only if the OS touch event 210 is determined to either be inside or to start inside that application's display region, sub-region, regions, and/or sub-regions.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

The touch screen device described herein may be a multi-touch display device. Multi-touch display devices encompass a wide variety of display devices and associated systems and components. Some multi-touch display devices require physical contact with a surface of the multi-touch display device in order to receive input. For example, such a multi-touch display device may receive input by detecting contact with a surface of the multi-touch display device by a finger, a stylus, some other mechanical, electro-mechanical, or magnetic input mechanism and/or any combination of multiple such input mechanisms at the same time. Furthermore, some such multi-touch display devices may be configured such that the surface that receives input may appear to be the same surface on which the multi-touch display device displays objects (whether or not the surface that receives input actually is the same surface as the surface on which the multi-touch display device displays objects). Alternatively, other such multi-touch display devices may receive input on a surface that is clearly remote and distinct from the surface on which the multi-touch display device displays objects. One example of such a multi-touch display system is a multi-point input capable standalone tablet that provides input to a remote and distinct display.

Other multi-touch display devices do not require physical contact with the surface of the multi-touch display device in order to receive input. For example, such multi-touch display devices may receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

Furthermore, the various different transformations and annotations disclosed herein may be implemented by any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Moreover, some of the various different transformations and annotations disclosed herein are not limited to implementation on a multi-touch device and thus may be implemented on a single-point device.

Various modifications may be made. For example, useful results still may be achieved if steps of the disclosed techniques are performed in a different order. Moreover, useful results may be achieved by combining various steps or components of the various disclosed techniques in a different manner and/or if components of the disclosed systems are combined in a different manner and/or replaced or supplemented by other components.

What is claimed is:

1. A computer-implemented method, comprising:
   rendering, on a display screen of a touch screen device, a graphical user interface of an application, the display screen having a display area for rendering images and the graphical user interface of the application being rendered in a portion of the display area;
   generating digital touch data in response to user interactions with a touch-sensitive surface of the touch screen device;
   converting, using a module of an operating system (OS) residing on the touch screen device, the digital touch data into OS touch events;
   receiving, at a system hook, the OS touch events;
   receiving, at the system hook, application location information that identifies the portion of the display area of the touch screen device in which the graphical user interface of the application is being rendered;
   filtering, by the system hook, the OS touch events based on the application location information; and
   providing, by the system hook, the filtered OS touch events to the application.

2. The computer-implemented method of claim 1, wherein generating the digital touch data comprises:
   receiving touch input from a touch screen of the touch screen device; and
   converting the touch input into digital touch data using a touch screen driver.

3. The computer-implemented method of claim 2, further comprising routing the digital touch data to the module of the OS through a virtual bus device.

4. The computer-implemented method of claim 3, wherein the virtual bus device comprises a virtual USB device.

5. The computer-implemented method of claim 2, wherein the touch input is input generated by one or more user fingers contacting the touch screen of the touch screen device.

6. The computer-implemented method of claim 5, wherein the touch input comprises one of: a one finger tap, a one finger swipe, a one finger flick, a one finger double tap, or combinations thereof.

7. The computer-implemented method of claim 5, wherein the touch screen device is a multi-touch device and the touch input comprises one of: a multiple finger tap, a multiple finger swipe, a multiple-finger press-and-hold, a multiple-finger flick, a multiple finger pinch, a multiple finger expansion, a multiple finger press-and-tap, or combinations thereof.

8. The computer-implemented method of claim 2, wherein the touch screen driver is further configured to provide the digital touch data to the application.

9. The computer-implemented method of claim 2, wherein the touch screen device is a multi-touch device and the touch screen driver is configured to convert user-generated touch input from multiple users simultaneously touching the touch screen device.

10. The computer-implemented method of claim 1, wherein the OS of the touch screen device is one of: a version of the WINDOWS OS, a version of the Mac OS, and a version of the Linux OS.

11. The computer-implemented method of claim 1, wherein the graphical user interface of the application comprises a window rendered in the portion of the display area and the application location information identifies a location and a size of the displayed window.

12. The computer-implemented method of claim 1,
   further comprising: receiving, at the system hook, real mouse events from a device input,
   wherein the device input is in communication with a peripheral mouse,
   wherein the peripheral mouse is communicatively coupled to the touch screen device, and
   wherein user-generated mouse input on the peripheral mouse is converted into real mouse events by the device input.

13. The computer-implemented method of claim 12, further comprising passing, by the system hook, the real mouse events to the application.

14. The computer-implemented method of claim 1, wherein filtering, by the system hook, the OS touch events comprises:
   accessing location information for a particular OS touch event, the location information for the particular OS touch event indicating a location of touch input on the display area of the touch screen device that triggered the particular OS touch event;
   determining, based on the location information for the particular OS touch event and the application location information, to apply application-specific filtering criteria to the particular OS touch event; and applying the application-specific filtering criteria to the particular OS touch event.

15. The computer-implemented method of claim 14, wherein applying the application-specific filtering criteria to the particular OS touch event comprises filtering out the particular OS touch event to cause the particular OS touch event to not be reported to the application.

16. The computer-implemented method of claim 14, wherein determining to apply the application-specific filtering criteria comprises determining that a starting location of the touch input that triggered the particular OS touch event is located inside the portion of the display area in which is rendered the graphical user interface of the application.

17. The computer-implemented method of claim 14, wherein determining to apply the application-specific filtering criteria comprises determining that an ending location of the touch input that triggered the particular OS touch event is located inside the portion of the display area in which is rendered the graphical user interface of the application.

18. The computer-implemented method of claim 14, wherein determining to apply the application-specific filtering criteria comprises determining that a starting and an ending location of the touch input that triggered the particular OS touch event is located inside the portion of the display area in which is rendered the graphical user interface of the application.

19. The computer-implemented method of claim 1, wherein the OS touch events comprise emulated mouse events.

20. The computer-implemented method of claim 1, wherein the touch screen device comprises a multi-touch capacitive touch screen device.

21. The computer-implemented method of claim 1, wherein the application location information comprises at least one of: coordinate information associated with a window of the application, coordinate information associated with a window pane of the application, size information associated with a window of the application, size information associated with a window pane of the application, or combinations thereof.

22. The computer-implemented method of claim 1, wherein the application location information designates a location at a pixel level.

23. The computer-implemented method of claim 1, further comprising generating the application location information when the application is launched on the touch screen device and updating the application location information as the portion of the display area in which is rendered the graphical user interface of the application changes during user interaction with the application.

24. A touch screen device comprising:
a touch screen including:
a display screen having a display area for rendering images, and
a touch-sensitive surface positioned over the display screen; and
a computer processor configured to:
enable rendering of a graphical user interface of an application in a portion of the display area of the display screen;
generate digital touch data in response to user interactions with the touch-sensitive surface;
convert, using a module of an operating system (OS) residing on the touch screen device, the digital touch data into OS touch events;
receive, at a system hook, the OS touch events;
receive, at the system hook, application location information that identifies the portion of the display area of the display screen in which the graphical user interface of the application is being rendered;
filter, by the system hook, the OS touch events based on the application location information; and
provide, by the system hook, the filtered OS touch events to the application.

25. A computer-readable storage medium storing software instructions that, when executed by a computer processor of a touch screen device, cause the computer processor to:
render, on a display screen of the touch screen device, a graphical user interface of an application, the display screen having a display area for rendering images and the graphical user interface of the application being rendered in a portion of the display area;
generate digital touch data in response to user interactions with the touch-sensitive surface of the touch screen device;
convert, using a module of an operating system (OS) residing on the touch screen device, the digital touch data into OS touch events;
receive, at a system hook, the OS touch events;
receive, at the system hook, application location information that identifies the portion of the display area of the touch screen device in which the graphical user interface of the application is being rendered;
filter, by the system hook, the OS touch events based on the application location information; and
provide, by the system hook, the filtered OS touch events to the application.

* * * * *